United States Patent
Favero et al.

(10) Patent No.: US 11,118,101 B2
(45) Date of Patent: Sep. 14, 2021

(54) MULTIPHASE POLYMER SUSPENSION AND USE THEREOF

(71) Applicant: S.P.C.M. SA, Andrezieux Boutheon (FR)

(72) Inventors: Cédrick Favero, Andrezieux Boutheon (FR); Alexandre Omont, Andrezieux Boutheon (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 36 days.

(21) Appl. No.: 16/475,254

(22) PCT Filed: Feb. 15, 2018

(86) PCT No.: PCT/FR2018/050361
§ 371 (c)(1),
(2) Date: Jul. 1, 2019

(87) PCT Pub. No.: WO2018/154219
PCT Pub. Date: Aug. 30, 2018

(65) Prior Publication Data
US 2019/0330517 A1 Oct. 31, 2019

(30) Foreign Application Priority Data
Feb. 24, 2017 (FR) ...................................... 1751501

(51) Int. Cl.
*C09K 8/588* (2006.01)
*C02F 1/52* (2006.01)
(Continued)

(52) U.S. Cl.
CPC ............ *C09K 8/588* (2013.01); *C02F 1/5245* (2013.01); *C02F 1/5272* (2013.01); *C02F 1/56* (2013.01);
(Continued)

(58) Field of Classification Search
None
See application file for complete search history.

(56) References Cited

U.S. PATENT DOCUMENTS

2005/0239957 A1    10/2005  Pillsbury et al.
2013/0072405 A1*   3/2013   Favero ..................... C09K 8/12
                                                              507/225
(Continued)

FOREIGN PATENT DOCUMENTS

WO    2005/100423 A1    10/2005
WO    2009/047480 A1    4/2009
(Continued)

OTHER PUBLICATIONS

International Search Report (and English Translation) and Written Opinion of the International Searching Authority for PCT/FR2018/050361 dated May 8, 2018.
(Continued)

*Primary Examiner* — Jeffrey D Washville
(74) *Attorney, Agent, or Firm* — Heslin Rothenberg Farley & Mesiti P.C.

(57) ABSTRACT

The present invention relates to an aqueous multiphase particulate suspension comprising a water-soluble polymer and to an enhanced oil recovery method using said suspension. The invention further relates to the use of the multiphase suspension in a drilling, hydraulic fracturing and mining effluent treatment operation.

18 Claims, 1 Drawing Sheet

(51) Int. Cl.
  *C08L 33/02* (2006.01)
  *E21B 43/16* (2006.01)
  *C09K 8/14* (2006.01)
  *C02F 1/56* (2006.01)
  *C08L 33/26* (2006.01)
  *C02F 1/00* (2006.01)
  *C02F 103/10* (2006.01)

(52) U.S. Cl.
  CPC ............ *C08L 33/02* (2013.01); *C08L 33/26* (2013.01); *E21B 43/16* (2013.01); *C02F 2001/007* (2013.01); *C02F 2103/10* (2013.01); *C08L 2201/54* (2013.01); *C09K 2208/14* (2013.01)

(56) References Cited

U.S. PATENT DOCUMENTS

2013/0324443 A1* 12/2013 Wang .................... C09K 8/487
                                                          507/121
2015/0183979 A1*  7/2015 Pabalan ................. C08L 33/08
                                                          524/44
2016/0298023 A1   10/2016 Cadix et al.

FOREIGN PATENT DOCUMENTS

| WO | 2010/133258 A1 | 11/2010 |
| WO | 2011/100665 A2 | 8/2011 |
| WO | 2013/015003 A1 | 1/2013 |
| WO | 2013/150203 A1 | 10/2013 |
| WO | 2014/075964 A1 | 5/2014 |
| WO | 2016/051777 A1 | 4/2016 |
| WO | 2016/069937 A1 | 5/2016 |

OTHER PUBLICATIONS

Thomas, S., "Enhanced Oil Recovery—An Overview", Oil & Gas Science and Technology—Rev. IFP, vol. 63, No. 1, pp. 9-19 (2008).

* cited by examiner

MULTIPHASE POLYMER SUSPENSION AND USE THEREOF

CROSS REFERENCE TO RELATED APPLICATIONS

This application is a national stage filing under section 371 of International Application No. PCT/FR2018/050361, filed on Feb. 15, 2018, and published on Aug. 30, 2018 as WO 2018/154219, which claims priority to French Application No. 1751501, filed on Feb. 24, 2017. The entire contents of WO2018/154219 are hereby incorporated herein by reference.

The present invention relates to an aqueous multiphase particulate suspension and its use in the technical fields of enhanced oil recovery in a deposit, hydraulic fracturing, mining effluent treatment and drilling operations in civil engineering and in oil and gas operations.

Most of the oil fields exploited currently have become mature and have therefore started to decline in production or are about to. The recovery level for these fields is currently of the order of 15 to 35% on average relative to the initial quantity of oil. Therefore, they offer even more considerable production potential.

Generally, crude oil contained in deposits is recovered in several stages.

The production results first from the natural energy of the fluids and rock that decompress. At the end of this depletion phase, the amount of oil recovered on the surface is an average of some 5 to 15% of the initial reserve. It is therefore necessary, in a second stage, to employ techniques targeting increased recovery yields while maintaining the pressure in the field.

The most frequent method consists of injecting water into the deposit through injection wells dedicated to this purpose. This is called secondary recovery. This second phase stops when the water/oil ratio is too high, i.e. when the quantity of water in the mixture produced by producing wells is too high. This secondary recovery level produces additional recovery of the order of 10 to 20%.

The other techniques that can be used are together called enhanced oil recovery (EOR). Their goal is to recover between 10 and 35% of additional oil relative to the initial quantity of oil. Diverse treatments with or without heat are known under the term enhanced oil recovery, such as techniques called electric, miscible, vapor, or chemical for improved recovery of remaining oil (See "*Oil & Gas Science and Technology*"—IFP review, vol 63 (2008) No. 1, pp 9-19). "Oil" means any type of oil, i.e. both light and heavy oil, or even bitumen.

The present invention more specifically relates to chemically enhanced oil recovery involving the continuous injection of a fluid composition, also called injection fluid, containing at least one water-soluble polymer, said composition being able to push the oil outside the rock.

"Oil" means any type of oil, i.e. both light and heavy oil, or even bitumen. An oil generally results from the natural transformation of organic material and is composed of a mixture of hydrocarbons. In the description of the prior art or of the invention, the terms "petroleum" and "oil" denote the same material, with the exception of statements about the composition of an emulsion.

The efficacy of flushing by water injection is generally improved through the addition of water-soluble polymers. The expected and proven benefits of using polymers, through the "viscosification" of injected waters, are improved flushing and reduced viscosity contrast between the fluids, to control their mobility ratio in the field, so as to recover the oil quickly and efficiently. These polymers increase the water's viscosity.

It is known to the person skilled in the art that synthetic water-soluble polymers, particularly polymers having an acrylamide base, are very advantageous for increasing the viscosity of aqueous solutions and are primarily used in enhanced oil recovery.

Generally, the injection fluid is in the form of a solution in which the viscosifying water-soluble polymer is completely dissolved.

There are several forms of water-soluble polymers: powder, solution, emulsion.

The powder form is the most widely used. The powder is dissolved in water or in a brine before being injected into the deposit. This essential step requires additional equipment and a lengthy preparation time. Powder is traditionally preferred due to its cost and stability, and when the project considered has no major constraints regarding footprint, load weight, or product transfer over large distances.

The solution form contains polymer dissolved in water. It is not very widely used because it cannot contain a large quantity of polymer due to the excessive viscosity afforded by the polymer. Generally, the maximum polymer concentration is about 2 to 5% by weight, but never exceeds 5%.

In emulsion form, more specifically reverse emulsion (water in oil), the polymer is in hydrophilic micrometric droplets emulsified using surfactants in a continuous oily phase. Generally, the reverse emulsions contain between 20 and 60% by weight of polymer. They are particularly used in projects at sea, on offshore platforms, since they do not require heavy equipment in order to reverse the emulsions and prepare the injection fluid, if necessary. They thus make it possible to limit the footprint and the weight and can be transferred over long distances by pumping.

Document WO2009/047480 describes a fluid that can comprise seawater, a polymer of the hydroxyethyl cellulose type, polypropylene glycol, NaCl salt and melamine (1,3,5-triazine-2,4,6-triamine). This fluid comprises 0.75% by weight, or less, of a polymer of the hydroxyethyl cellulose type.

Document WO2016/051777 describes compositions used in the field of hydraulic fracturing. These compositions do not comprise more than 0.1% by weight of polymer and no more than 5% by weight of salt.

Document WO2011/100665 describes a thickening composition and its use, for example in the field of oil recovery. This composition does not comprise more than 3% by weight of water-soluble polymer and no more than 2% by weight of salt.

Document US2005/0239957 describes an example of reverse emulsion production and suggests the use thereof in enhanced oil recovery.

Document WO2014/075964 also addresses the issue of the long-term stability of these reverse emulsions, in particular under storage conditions on offshore platforms. To resolve the problem, use of another form of polymer is proposed: "Liquid Dispersion Polymer" (LPD), obtained by removing a large portion of the water from a reverse emulsion. The proportion of polymer of these "LDP"s is thus approximately 50% by weight, and the presence of water is limited to less than 5% by weight, the rest generally being surfactants and organic solvents making up the oil phase of the emulsion.

However, whether they are reverse emulsions or Liquid Dispersion Polymers, they contain an oil phase that is found in droplet form in the injection fluid. These droplets of oil in the aqueous injection fluid create propagation problems in the underground formation and cause a multiphase flow that is much more complex to master.

Documents SPE 4369 "Oil-in-Water Emulsions and Their Flow Properties in Porous Media" and SPE 5859 "Flow of oil-in Water Emulsions Through Tubes and Porous Media" explain why and how the oil droplets resulting from reverse emulsions or LDPs negatively affect the permeability of underground formations.

Beyond these traditional forms, there is a new liquid form containing the polymer in powder form. Document WO2016069937 describes a polymeric composition comprising a polymer in powder form suspended in a solvent with HLB greater than 8 This dispersion is anhydrous and preferably contains surfactants.

However, the presence of solvents in these compositions raises a safety problem during transport and during handling to prepare the injection fluid. Furthermore, the presence of these solvents, especially surfactants, can raise compatibility problems with certain aqueous injection fluid ingredients, as well as propagation problems in the underground formation. In particular, the solvent and the surfactants may interact and form droplets that create complex polyphasic flows, as in the use of reverse emulsions.

The oil industry is looking for simpler products and methods for enhanced oil recovery by using minimal, safer equipment while using compatible, less dangerous products that are easy to transfer from one storage site to another, all while minimizing the preparation time of the polymers, the footprint, the total weight of the installations, and not creating propagation problems in the reservoir.

The Applicant has discovered that it is possible to formulate a polymer in powder form in order to form a liquid in the form of a particulate multiphase suspension having a polymer concentration greater than 20% by weight without an excessive viscosity problem, having good stability, and usable without requiring specific equipment for placing in solution.

"Multiphase suspension" refers to a suspension containing at least two separate phases, in this case at least one aqueous phase and one solid phase.

The present invention therefore relates to an aqueous particulate multiphase suspension comprising:
  15 to 60% by weight of at least one water-soluble polymer in the form of solid particles of average size comprised between 5 and 500 µm;
  15 to 45% by weight of at least one alkali metal salt and/or at least one alkaline earth metal salt;
  at least one viscosifying agent other than the water-soluble polymer;
  at least 10% by weight of water; and
  said suspension having a Brookfield viscosity comprised between 500 and 20,000 cps, and
  said suspension having a density comprised between 1.1 and 2 kg/l.

The Brookfield viscosity is measured with a Brookfield device LVT model, mounted with an LV spindle, where the spindle can turn at a rate of 30 rpm, and where measurement is advantageously conducted at 20° C. This involves measuring the viscosity of the multiphase suspension as defined according to the invention.

One skilled in the art will know how to adapt not only the spindle (LV-1 to LV-4, for example) of the Brookfield viscometer, but also the speed of the spindle as a function of the viscosity of the multiphase suspension.

In the description, this viscosity is called Brookfield viscosity.

Density is measured at 25° C., at a pressure of 1 atm, i.e., 101,325 Pa.

The present invention also relates to a process for enhanced oil recovery comprising the following steps:
  Preparing an injection fluid by mixing an aqueous particulate multiphase suspension according to the invention, with water or a brine;
  Injecting the injection fluid into a reservoir, i.e., into an underground formation;
  Recovering the aqueous and oily and/or gaseous mixture, i.e., a mixture containing water and hydrocarbons.

Preferably, the injection fluid contains fewer salts than the particulate multiphase suspension.

Preferably, the particulate multiphase suspension contains substantially no solvent(s), and substantially no surfactant(s). In fact, as previously explained, their presence generates multiphase flows that are much more complex to master. Of course, when smaller quantities (less than 1% by weight) of solvent are present in the particulate multiphase suspension, this is not necessarily problematic. However, and preferably, the particulate multiphase suspension does not contain any solvent.

Likewise and preferably, the particulate multiphase suspension contains substantially no surfactant. A presence of surfactant below 0.5% by weight, preferably below 0.1% by weight, will not necessarily be problematic. However, and preferably, the particulate multiphase suspension does not contain any surfactant.

According to a preferred embodiment, the particulate multiphase suspension comprises between 15 and 60% by weight of water-soluble polymer, preferably between 20 and 45%, and more preferably between 25 and 40%. As already indicated, the water-soluble polymer assumes the form of solid particles in the multiphase suspension. The water-soluble polymer is not solubilized in the multiphase suspension.

Due to the high density of the suspensions according to the invention, the suspensions contain between 300 and 750 kg of active polymer per $m^3$ of suspension, preferably from 400 to 750 $kg/m^3$, more preferably from 500 to 750 $kg/m^3$. This provides a technical advantage in the methods in which the suspensions according to the invention are used, for example the smaller occupancy of the polymer storage volume.

According to a preferred embodiment, the average size of the water-soluble polymer particles is between 10 µm and 400 µm, preferably between 50 µm and 200 µm. The water-soluble polymer particles can have a standard spherical shape, like balls, or an irregular shape.

The average size of the water-soluble polymer particles is the average size of the largest dimension, for example, the diameter for the spherical particles, measured with a laser measuring device using the conventional techniques that are part of the knowledge of one skilled in the art. A Mastersizer type device by the Malvern Company, the MS2000 for example, can be used to that end. This type of device makes it possible to measure, by laser diffraction, the particle size distribution of the particles in liquid medium or in solid form, preferably in the multiphase suspension.

The water-soluble polymer can be a natural polymer, for example xanthan gums, guar gums or other compounds in the polysaccharide family, or a synthetic or semi-synthetic polymer. Preferably, the water-soluble polymer is a synthetic polymer.

When the water-soluble polymer is a synthetic polymer, it is preferably a polymer obtained from at least one non-ionic monomer and/or at least one anionic monomer and/or at least one cationic monomer.

The nonionic monomer or monomers that can be used in the scope of the invention can be chosen, in particular, in the group comprising water-soluble vinyl monomers. Preferred monomers belonging to this class are acrylamide, methacrylamide, N-isopropylacrylamide, N,N-dimethylacrylamide and N-methylolacrylamide. It is also possible to use N-vinylformamide, N-vinyl acetamide, N-vinylpyridine and N-vinylpyrrolidone, acryloyl morpholine (ACMO) and diacetone acrylamide. A preferred nonionic monomer is acrylamide.

The anionic monomers are preferably chosen from among acrylic acid, methacrylic acid, itaconic acid, maleic acid, 2-acrylamido-2-methylpropane sulfonic acid (ATBS), vinylsulfonic acid, vinylphosphonic acid, said anionic monomer being non-salified, partially or totally salified, and the 3-sulfopropyl methacrylate salts.

The cationic monomer or monomers that can be used in the scope of the invention may be chosen from among monomers of the acrylamide, acrylic, vinyl, allyl or maleic type, having a quaternary ammonium function. Mention may be made, in particular and in a non-limiting way, of quaternized dimethylaminoethyl acrylate (ADAME), quaternized dimethylaminoethyl acrylate, (MADAME), dimethyldiallylammonium chloride (DADMAC), acrylamido propyltrimethyl ammonium chloride (APTAC) and methacrylamido propyltrimethyl ammonium chloride (MAPTAC).

According to certain embodiments, in addition to the above monomers, the water-soluble copolymer(s) can also comprise one or several hydrophobic monomers. Documents WO2005/100423 and WO2013/15003 exemplify adequate and advantageous hydrophobic monomers.

The water-soluble polymer is preferably an acrylamide-based anionic polymer, preferably a copolymer of acrylamide and acrylamide tertiary butyl sulfonic acid (ATBS) optionally partially post-hydrolyzed, more preferably a terpolymer of acrylamide, acrylic acid and acrylamide tertiary butyl sulfonic acid (ATBS).

The water-soluble polymer preferably contains between 10% and 50% mol of anionic monomer(s), more preferably between 25% and 40% mol.

The water-soluble polymer preferably contains between 1% and 10% mol of ATBS.

In a preferred manner, the water-soluble polymer contains only monomeric anionic and nonionic units. In other words, it is preferably obtained from at least one type of anionic monomer and at least one type of nonionic monomer.

The water-soluble polymer can further be structured by at least one structure agent, which can be chosen from the group comprising unsaturated polyethylene monomers (having at least two unsaturated functions), such as vinyl, allyl, acrylic and epoxy functions, and for example mention may be made of methylene-bis-acrylamide (MBA), triallyamine, or by macroprimers such as polyperoxides, polyazoics and transfer polyagents such as polymercaptan polymers.

According to the invention, the water-soluble polymer is not cross-linked. It can be linear or structured, i.e., branched, star-shaped, associative (containing groups of hydrophobes), heat-sensitive (with groups with a LCST), or comb-shaped.

According to the general knowledge of a person skilled in the art, LCST groups correspond to groups whose water solubility for a determined concentration is modified beyond a certain temperature and as a function of the salinity. This is a group having a heating transition temperature defining its lack of affinity with the solvent medium. The lack of affinity with the solvent results in opacification or loss of transparency, which may be due to precipitation, aggregation, gelification, or viscosification of the medium. The minimum transition temperature is known as "LCST" (Lower Critical Solution Temperature). For each concentration of the LCST group, a heating transition temperature is observed. It is greater than the LCST, which is the lowest point in the curve. Below this temperature, the polymer is soluble in water, above this temperature, the polymer loses its solubility in water.

Structured polymer denotes a non-linear polymer that has side chains such that, when said polymer is dissolved in water, a high state of entanglement leading to viscosities with significantly low gradients is obtained.

The primary function of the polymers according to the invention is viscosifying the waters injected into the reservoirs containing oil to ensure control of mobility without the necessity of recourse to crosslinking, i.e. an interchain chemical bridge.

To achieve an identical structure and chemistry, viscosity is higher when the size of the polymer chain is long. This is related to the physical entanglements between the chains, creating a resistance to molecular mobility, which generates viscosity. In the context of the present invention, it is therefore advantageous to use polymers with a high molecular weight.

"High molecular weight" denotes molecular weights of at least 1 million g/mol, preferably between 2 and 40 million g/mol, more preferably between 5 and 30 million g/mol. Molecular weight is understood as average molecular weight by weight.

According to the invention, the water-soluble polymers used do not require particular development of the polymerization method. They can be obtained using all of the polymerization techniques well known by those skilled in the art resulting in a polymer in powder form: gel polymerization followed by drying and grinding steps; polymerization by precipitation; polymerization in solution, followed by a spray drying step; polymerization in reverse suspension to obtain microbeads; micellar polymerization, which may or may not be followed by a precipitation step; post-hydrolysis or co-hydrolysis polymerization; so-called "template" radicular polymerization, or controlled radicular polymerization, more particularly the RAFT (Reversible Addition Fragmentation Chain Transfer) type.

The preferred mode of production is the gel method followed by drying and grinding in order to obtain polymer particles of the desired average size.

According to a preferred embodiment, the particulate multiphase suspension comprises between 20 to 40% by weight of at least one alkali metal salt and/or of at least one alkaline earth metal salt.

Although it is possible to obtain satisfactory particulate multiphase suspensions with any type of alkali metal and/or alkaline earth metal salts, the nature of the salt(s), as well as the ratio of one to the other, makes it possible to obtain even more satisfactory particulate multiphase suspensions, particularly in terms of the stability of the suspension over time, ease of implementation of the suspension in the application, and injectivity.

Advantageously, the alkali metal salt and/or the alkaline earth metal salt is a salt of a halide.

Preferably, the alkaline earth metal salt is $CaCl_2$ or $CaBr_2$, or a mixture of the two, and preferably a combination of the two. Still more preferably, the ratio between $CaCl_2$ and $CaBr_2$ is between 10:1 and 1:2, preferably between 8:1 and 2:1. These embodiments make it possible to obtain better performance levels.

The particulate multiphase suspension according to the invention also comprises at least one viscosifying agent other than the water-soluble polymer. Although many types of viscosifying agents are appropriate for formulating a satisfactory suspension, the Applicant has observed that performance levels were improved when the viscosifying agent was a cellulose derivative, and more preferably hydroxy cellulose and a derivative of hydroxy cellulose, and still more preferably hydroxyethyl cellulose.

It is, however, possible to use silicas and bentonites, but the latter can have a negative impact on the injectivity.

The particulate multiphase suspension according to the invention preferably comprises between 0.01 and 5% by weight of viscosifying agent, more preferably between 0.1 and 1% by weight.

The particulate multiphase suspension according to the invention has a density of between 1.1 and 2, preferably between 1.3 and 1.9 kg/l.

The particulate multiphase suspension according to the invention comprises more than 10% by weight of water, preferably more than 15%, still more preferably more than 20%.

The person skilled in the art will know how to adjust the percentage by weight of each of the components of the particulate multiphase suspension such that the sum of the percentages is equal to 100.

The particulate multiphase suspension has a viscosity of between 500 cps and 20000 cps. Preferably, its viscosity is between 1000 and 8000 cps.

The particulate multiphase suspension according to the invention is prepared by first mixing water and the salt(s), then adding the viscosifying agent, and lastly the water-soluble polymer particles. The preparation of the suspension is preferably done such that before adding the particles of water-soluble polymer, the density of the liquid in which the particles are added is between 1.1 and 2 kg/l, preferably between 1.3 and 1.9 kg/l.

In one particularly advantageous embodiment, the particulate multiphase suspension comprises:
- 15 to 60% by weight of at least one water-soluble copolymer in the form of a solid particle with an average size of between 5 and 500 μm, said copolymer being a post-hydrolyzed or non-post-hydrolyzed copolymer of acrylamide and acrylic acid, or a post-hydrolyzed or non-post-hydrolyzed copolymer of acrylamide and ATBS, or a post-hydrolyzed or non-post-hydrolyzed terpolymer of acrylamide, acrylic acid and ATBS, said polymer having a molecular weight of between 5 and 40 million g/mol;
- 15 to 45% by weight of a mixture of $CaCl_2$ and $CaBr_2$ in a weight ratio of between 10:1 and 1:2;
- 0.01 to 5% by weight of hydroxy cellulose, at least 10% by weight of water, and
- said suspension having a Brookfield viscosity of between 500 and 20,000 cps, and
- said suspension having a density of between 1.1 and 2 kg/l.

The present invention also relates to a process for enhanced oil recovery comprising the following steps:
- Preparing an injection fluid by mixing an aqueous particulate multiphase suspension according to the invention, with water or a brine;
- Injecting the injection fluid into a reservoir;
- Recovering the aqueous and oily and/or gaseous mixture.

Preferably, the injection fluid contains fewer salts (lower weight percentage) than the particulate multiphase suspension.

One of the major advantages of the polymer suspension and the method according to the invention is the ability to quickly and easily prepare an injection fluid in concentrated form in water-soluble polymer.

Thus, the enhanced oil recovery process is simpler, since it does not use heavy equipment to implement the form in which the polymer is delivered to the oil fields. It is quicker and minimizes the preparation time of the polymer solutions while not creating propagation problems in the reservoir. And since the suspensions have high densities, and the suspensions contain between 300 and 750 kg of active polymer per $m^3$ of suspension, which is a large quantity of polymer by volume of product delivered (the suspension), it takes up much less space.

In a preferred embodiment, mixing the suspension with water or brine is done for less than one hour, preferably for less than 10 minutes.

In the case where the transport of the mixture thus obtained is short, around several minutes, then the injection fluid prepared from the mixture can be injected less than 1 hour, or even less than 15 minutes after the mixing between the multiphase suspension and the water or brine starts. This short time frame is particularly advantageous in order to optimize the material flows in these enhanced oil recovery operations, which are often complex.

In a preferred embodiment, the mixing between the multiphase suspension and the water or brine is done partially in a static or dynamic mixer, or in an agitated tank, or in a dispersion device for particulate polymer suspension.

In a preferred embodiment, the multiphase suspension is mixed with water or a brine containing fewer salts than the multiphase suspension to yield an intermediate composition, said intermediate composition next being mixed with water or a brine containing fewer salts than the multiphase suspension to yield the injection fluid.

In a preferred embodiment, the multiphase suspension is added on-line in a pipe transporting water or a brine forming an injection fluid, said injection fluid pumped directly into the reservoir, with no mixing step other than the turbulence in the pipe.

In general, before injection, the injection fluid contains between 20 ppm and 5000 ppm by weight of one or several water-soluble copolymers as previously described, preferably between 300 ppm and 4000 ppm.

The SP (Surfactant Polymer) and ASP (Alkaline Surfactant Polymer) techniques, well known by the person skilled in the art, can be implemented with the same principle according to the invention. Likewise, the polymers viscosifying the injection fluid can be protected using the techniques described in document WO2010/133258.

Advantageously, at the time of injection, the injection fluid has a viscosity of between 1 and 200 cps (centipoises) (viscosity measurements at 20° C. with a Brookfield viscometer with a UL spindle and at a speed of 6 rpm).

In the context of the invention, the injection fluid is next injected into an oil deposit, i.e., into a reservoir (or underground formation), using a technique known by the person skilled in the art in enhanced oil recovery "RAP" or "EOR" methods. Preparation is done on site, just upstream from its injection into the deposit. In general, all of the components introduced into the water or the brine to make up the injection fluid are most often added on a circulation line of the aqueous solution or the brine.

The suspension according to the invention can be used in all fields in which water-soluble polymers with a high molecular weight are used, for example drilling operations, hydraulic fracturing and the treatment of mining effluents, as well as water treatment, paper manufacturing and construction.

The suspension according to the invention is of particular interest in different fields such as drilling operations, hydraulic fracturing and the treatment of mining effluents. One of the major advantages of the polymer form according to the invention is its ability to be prepared quickly and easily, in a water-soluble polymer concentration that transports easily.

As a result, the processes described above according to the invention are simpler, since they do not use heavy equipment to implement the form in which the polymer is delivered. They are quicker, take up less space, and make it possible to minimize the preparation time of the polymer solutions. These are invaluable assets in these industries.

Thus, the present invention also relates to the use of the multiphase suspension according to the invention in a drilling operation. More specifically, the invention also relates to the use of the multiphase suspension according to the invention to prepare a composition of an aqueous drilling fluid, commonly called "drilling mud", used to drill an underground well, a tunnel, a trench or a pile. This may involve Vertical Directional Drilling (VDD) or Horizontal Directional Drilling (HDD). The civil engineering and oil and gas recovery industries are particularly affected by these types of drilling.

The suspension according to the invention can be used alone as primary component of the drilling mud or as an additive in an existing drilling mud formulated with at least one other active material such as: bentonite, sepiolite, attapulgite, surfactants, water or a polymer.

Specialists generally agree that a rotating system is the correct form of drilling a pile, an oil or gas well. This system is based on rotating a drill string at the base of which a multi-tip drill bit, a bucket or a screw, in particular of the worm screw type, are attached. While the bit, the screw or the bucket drills the rock, debris continually accumulates as drilling progresses.

As a result, a drilling liquid must be used inter alia to bring this debris back to the surface so it can be eliminated, so the bit can continue to work and the drill hole can be kept clean and free of debris at all times.

The drilling "mud" liquid must also ensure the stability of the drilling hole as drilling progresses, and during the stop phases as well by keeping the debris or "cuttings" in suspension.

The drilling "mud" liquid must also inhibit the swelling of the clays, preventing the bit from blocking.

In the context of use for tunneling, the suspension according to the invention makes it possible to adjust the viscosity of the excavation mud and to control the pressure in the excavation chamber with great precision.

Drilling devices other than the rotary device such as the basket and the hydro-mill are sometimes used during drilling operations. These devices always require the presence of a drilling fluid, or "drilling mud", to eliminate the debris from the drilled hole or to otherwise perform functions related to drilling fluids.

The suspension according to the invention is particularly advantageous as an ingredient of a composition of an aqueous drilling liquid both in terms of ease of implementation and application performances obtained.

The suspension according to the invention permits polymers with a high molecular weight to be to be used with great ease of implementation, and a higher viscosity at equivalent dosage to be obtained.

The suspension according to the invention is particularly effective when the drilling operation is done in polluted soil, particularly by the presence of divalent cations, water with high salinity, cement pollution or any other contaminant providing an excess of electrolyte(s) responsible for the destruction of the viscosity by neutralization of the polymer.

The present invention also relates to the use of the multiphase suspension according to the invention in a hydraulic fracturing operation, in particular of non-conventional oil and gas reservoirs. Document WO2013/150203 describes this technology and a particularly advantageous polymeric composition.

The production of oil and gas contained in unconventional reservoirs has been in development for several years and requires fractures to be opened in the reservoir in order to produce oil and gas economically. The goal of hydraulic fracturation is to create extra permeability and to create vaster surfaces for gas and oil production. Indeed, low permeability, the natural barriers in compact layers, is water-proofing by drilling operations and greatly restricts production. The gas or oil contained in the unconventional reservoir cannot easily migrate from the rock to the well without stimulating the reservoir by hydraulic fracturing.

These operations consist in injecting water at high pressure and very high flow rate so as to create fractures spread perpendicularly in production wells. Generally the process has several steps to create fractures along the length of the horizontal well, which allows the maximum volume of the reservoir to be covered. To keep these fractures open, a propping agent is added (sand, plastic materials or calibrated ceramics) so as to prevent these fractures from closing and to maintain the capillarity created once injection ends.

Water alone is not enough to obtain good fracturing at high pressure due to head losses by friction, on the one hand, and good placement efficiency of the propping agent due to its low viscosity, on the other hand. This limits its capacity to fracture the reservoir effectively and to hold the propping agent in place in the fractures. To solve this problem, fracturation fluids have been developed, that contain polymer-based friction reducing and viscosifying compounds.

Among the viscosifying compounds of aqueous solutions belonging to the state of the art, acrylamide-based synthetic polymers are particularly known, and those modified by introducing hydrophobic groups are especially advantageous.

The suspension according to the invention is particularly advantageous both in terms of ease of implementation and the performance applications obtained. The improvement to propping properties and reduction in head losses can be cited.

The present invention also relates to the use of the multiphase suspension according to the invention in a mining effluent treatment operation. Document WO2014/736624 describes this technology and a particularly advantageous polymeric composition.

The treatment of these residues and other waste materials has become a technical, environmental, and public order problem. The use of synthetic or natural polymers, such as coagulants and flocculants, to separate the solids from the liquid is a current practice.

The suspension according to the invention is particularly advantageous both in terms of ease of implementation and application performances obtained. The improvement of the solid liquid separation and the improved clarity of the extracted water can be cited, for example.

The use of the multiphase suspension according to the invention has an advantage in a particular technique for treating mining effluents. This consists of combining a flocculant or a coagulant with a mining effluent, then discharging this treated effluent underwater.

More specifically, a mining effluent is transported toward a discharge zone consisting of an aquatic zone such as a pond or lake. During transport, the mining effluent is treated with a flocculant or a coagulant. The effluent thus treated is discharged into the aquatic zone, near the water level or below the water level, such that the treated effluent flows and falls into the aquatic zone wherein the solid part settles at the bottom, and the aqueous part is in the water of the aquatic zone. In other words, if the effluent is transported into a pipeline, the outlet of the pipe through which the treated effluent exits is either positioned near the aquatic zone or submerged in the aquatic zone. Preferably, the treated effluent exits directly into the aquatic zone, below water level. In this case, the submersion depth of the hose is preferably from 0.1 to 10 meters.

Thus, the invention also relates to a process for treating a mining effluent, comprising the following steps:
  combining the suspension according to the invention or an aqueous solution prepared from said suspension, with a mining effluent;
  discharging the effluent thus treated into an aquatic zone, near or below the water level such that the treated effluent flows and falls into the aquatic zone in which the solid part settles at the bottom, and the aqueous part finds itself in the water of the aquatic zone.

Quite surprisingly, use of the multiphase suspension according to the invention in this process makes it possible to efficiently treat mining effluent. Compaction during sedimentation is improved, as is water quality.

The invention and resulting benefits will become clearer from the following examples, supported by the figures.

EXAMPLES

The injection of polymer into a porous medium is a good method for ensuring the good propagation of molecules within the reservoir with minimal damage. Injectivity is evaluated through the measurement of head losses continually recorded via pressure sensors placed on either side of the system.

A good propagation generally results in a rapid stabilization of the head losses over time. Conversely, a steady pressure climb is proof of gradual plugging of the porous medium, which can cause irreversible damage to the reservoir and the impossibility of continuing the injection, resulting in shutting down the enhanced oil recovery process.

Injection of the injection fluids was done with water-saturated Bentheimer-type rocks.

The procedure used is described below:
  Preparing the Bentheimer rock specimen (9 cm long, 2.4 cm diameter). The sample is dried in an oven at 50° C. overnight, then the dry weight measured;
  Saturating the rock sample with synthetic seawater containing 30,000 ppm of NaCl and 3000 ppm of $CaCl_2$, using a vacuum pump. The wet weight is recorded and the porous volume deduced;
  The rock sample is placed in a sleeve within a sealed cell of the Hassler type at ambient temperature. A back-pressure of 30 bar is applied in the cell to constrain the rock in the sleeve;
  Different brine flow rates are applied using a pump, and the head losses within the porous medium are read. Permeability of the rock is calculated using Darcy's law;
  Q is the flow rate ($cm^3/s$)
  K is the permeability (Darcy)
  (P1-P2) is the head loss within the specimen (atm/cm)

$$Q = \frac{K(P1-P2)A}{\mu L}$$

where:
  A represents the section of the rock specimen ($cm^2$)
  $\mu$ is the viscosity of the injected fluid (centipoise)
  L is the length of the rock specimen (cm)
  Next, the injection of the injection fluid is done over several porous volumes (15) at a concentration of 2000 ppm. A porous volume corresponds to the empty volume within the rock, calculated by subtracting the dry weight from the wet weight of the rock.

Figure 1:
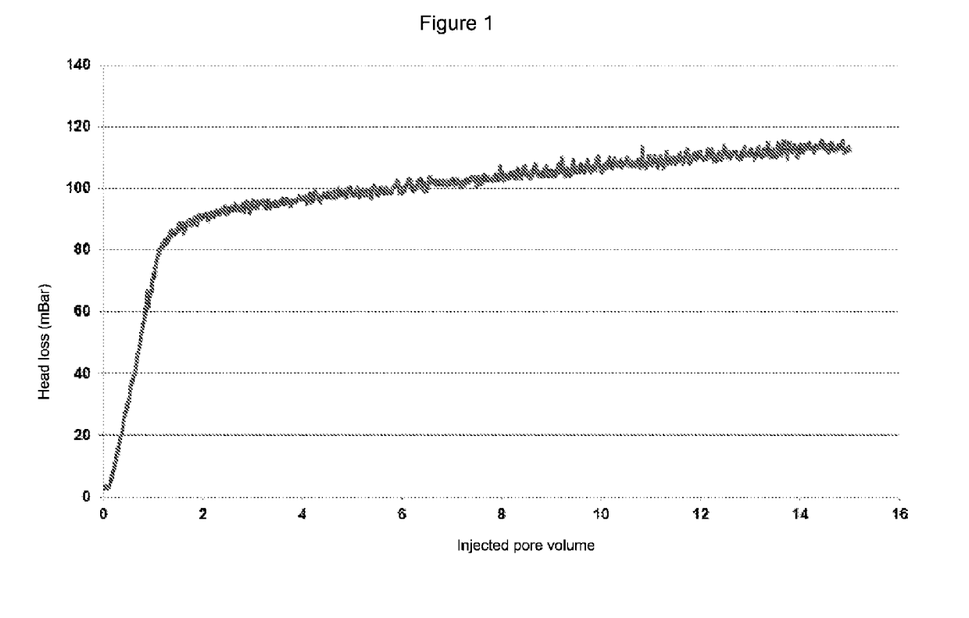
FIG. 1 is a graph showing the evolution of the head loss as a function of the quantity of injection fluid measured in volume equivalent to the pore volume, for an injection fluid A containing 2000 ppm of water-soluble polymer, and prepared from suspension of particles of terpolymer of acrylamide, acrylic acid and ATBS with a molecular weight of 12 million g/mol, suspended in an oil.
Figure 2:
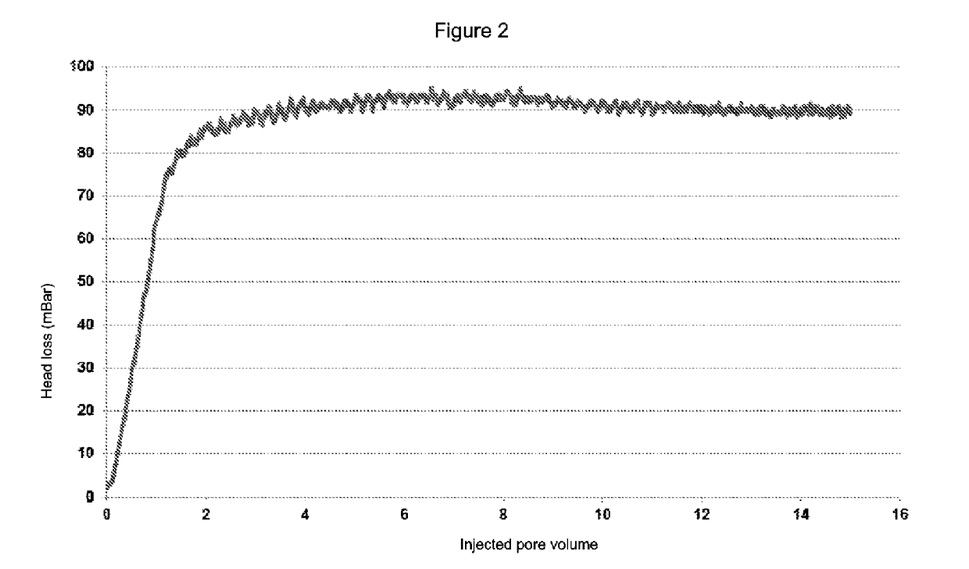
FIG. 2 is a graph showing the evolution of the head loss as a function of the quantity of injection fluid measured in volume equivalent to the pore volume, for an injection fluid B containing 2000 ppm of water-soluble polymer, and prepared from a particulate multiphase suspension according to the invention and in which the water-soluble polymer is an acrylamide, acrylic acid and ATBS terpolymer with a molecular weight of 12 million g/mol.

The head loss is recorded continuously. This results in a graph with the head losses in mbar on the y-axis and the number of injected porous volumes on the x-axis. The injections are done at 25° C.

In both of the following cases, the average particle size of the water-soluble polymer is 160 µm.

In a counterexample, an injection fluid A is prepared from a mixture of particles of acrylamide, acrylic acid and ATBS terpolymer having a molecular weight of 12 million g/mol, suspended in an oil doped with bentonite, said suspension comprising 30% by weight of polymer and 66% of organic solvent (Exxsol D100), and 4% by weight of bentonite.

The injection profile of injection fluid A shows a constant increase in the head loss. This increase demonstrates the poor propagation of injection fluid A, which gradually plugs the rock. Applied in an oil field, this can cause irreversible damage and lead to a total loss of injectivity.

In one example according to the invention, an injection fluid B is prepared from a particulate multiphase suspension according to the invention of particles of acrylamide acrylic acid and ATBS terpolymer having a molecular weight of 12 million g/mol, said suspension comprising (by weight): 36% terpolymer, 25% $CaCl_2$, 18% $CaBr_2$, and 0.05% hydroxyethyl cellulose.

The injection profile of injection fluid B shows a stabilization of the head loss after the injection of fluid volume equivalent to 3 pore volumes. The head loss next remains stable during injection, demonstrating a very good propagation of injection fluid B.

The multiphase suspension according to the invention has the advantage of being stable for more than 6 months. It does not contain any solvent or surfactant that can be harmful during injection. It is prepared quickly without the need for a complex solution preparation device.

The use of this multiphase particulate suspension in an enhanced oil recovery method makes it possible to simplify the preparation step of the injection fluid and makes it possible to achieve excellent results in injectivity.

The invention claimed is:

1. An aqueous particulate multiphase suspension comprising:
   15 to 60% by weight of at least one water-soluble polymer in the form of solid particles with average size comprised between 5 and 500 μm;
   15 to 45% by weight of a mixture of $CaCl_2$ and $CaBr_2$ having a weight ratio $CaCl_2$:$CaBr_2$ of between 10:1 and 1:2;
   at least one viscosifying agent other than the water-soluble polymer;
   at least 10% by weight of water; and
   said suspension having a Brookfield viscosity comprised between 500 and 20,000 cps, and
   said suspension having a density comprised between 1.1 and 2 kg/l.

2. The particulate multiphase suspension according to claim 1, wherein the particulate multiphase suspension contains less than 1% by weight of solvent, and less than 0.5% by weight of surfactant.

3. The multiphase particulate suspension according to claim 1, wherein the average size of the particles of water-soluble polymer is between 10 μm and 400 μm.

4. The multiphase particulate suspension according to claim 1, wherein the water-soluble polymer is an acrylamide-based anionic polymer, optionally at least partially post-hydrolyzed, and wherein the water-soluble polymer has a molecular weight of between 2 and 40 million g/mol.

5. The multiphase particulate suspension according to claim 1, wherein the viscosifying agent other than the water-soluble polymer is a cellulose derivative.

6. The multiphase particulate suspension according to claim 1, wherein the quantity of viscosifying agent other than the water-soluble polymer is between 0.01 and 5%.

7. The multiphase particulate suspension according to claim 1, wherein the density of the suspension is between 1.3 and 1.9 kg/l.

8. A process for enhanced oil recovery comprising the following steps:
   preparing an injection fluid by mixing an aqueous particulate multiphase suspension according to claim 1 with water or a brine;
   injecting the injection fluid into a reservoir; and
   recovering an aqueous and oily and/or gaseous mixture.

9. The process according to claim 8, wherein the mixing of the suspension and the water or brine is done for less than 1 hour.

10. The process according to claim 8, wherein the multiphase suspension is mixed with water or a brine containing fewer salts than the multiphase suspension to yield an intermediate composition, said intermediate composition next being mixed with water or a brine containing fewer salts than the multiphase suspension to yield the injection fluid.

11. The process according to claim 8, wherein the multiphase suspension is added on-line in a pipe transporting water or a brine forming an injection fluid, said injection fluid being injected directly into the reservoir, with no mixing step other than the turbulences in the pipe.

12. The process according to claim 8, wherein the mixing between the multiphase suspension and the water or brine is done partially in a static or dynamic mixer, or in an agitated tank, or in a dispersion device for particulate polymer suspension.

13. The process according to claim 8, wherein the mixing of the suspension and the water or brine is done for less than 10 minutes.

14. The multiphase particulate suspension according to claim 1, wherein the ratio between $CaCl_2$) and $CaBr_2$ is between 8:1 and 2:1.

15. The multiphase particulate suspension according to claim 5, wherein the viscosifying agent other than the water-soluble polymer is hydroxyethyl cellulose.

16. A process for treating a mining effluent, comprising the following steps:
   combining the suspension according to claim 1, or an aqueous solution prepared from said suspension, with a mining effluent; and
   discharging the effluent thus treated into an aquatic zone, near the water level or below the water level, such that the treated effluent flows and falls into the aquatic zone in which the solid part settles at the bottom and the aqueous part is in the water of the aquatic zone.

17. The multiphase particulate suspension according to claim 1, wherein the average size of the particles of water-soluble polymer is between 50 μm and 200 μm.

18. The multiphase particulate suspension according to claim 4, wherein the water-soluble polymer is selected from a copolymer of acrylamide and acrylamide tertiary butyl sulfonic acid (ATBS) optionally at least partially post-hydrolyzed, and a terpolymer of acrylamide, acrylic acid and acrylamide tertiary butyl sulfonic acid (ATBS), optionally at least partially post-hydrolyzed.

* * * * *

UNITED STATES PATENT AND TRADEMARK OFFICE
CERTIFICATE OF CORRECTION

PATENT NO. : 11,118,101 B2
APPLICATION NO. : 16/475254
DATED : September 14, 2021
INVENTOR(S) : Favero et al.

It is certified that error appears in the above-identified patent and that said Letters Patent is hereby corrected as shown below:

In the Claims

Column 14 Line 26 Claim 14, Delete "$CaCl_2$)" and insert -- $CaCl_2$ --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*